Sept. 2, 1969  H. SCHMIDT ET AL  3,464,757

DAY-NIGHT OPTICAL VIEWING DEVICE

Filed Oct. 22, 1965  2 Sheets-Sheet 1

INVENTORS
HORST SCHMIDT
HELLMUT BÖHMER
BY Spencer & Kaye
ATTORNEYS

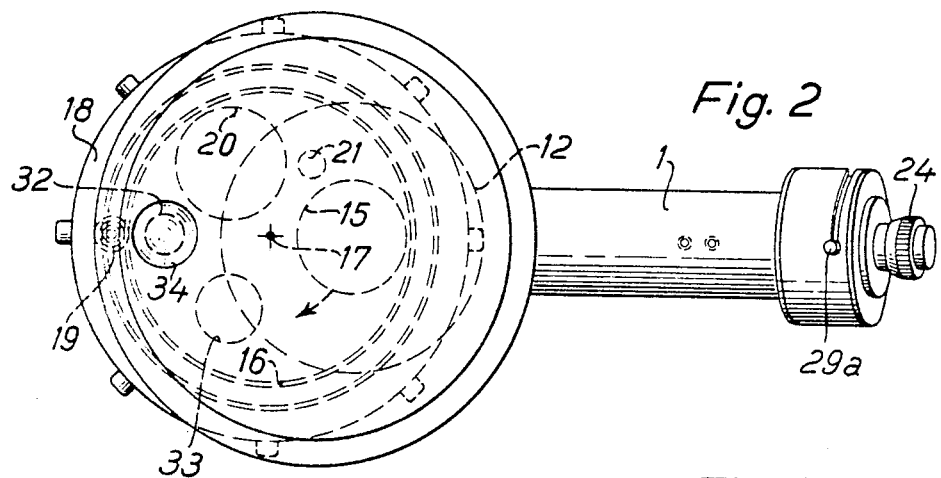
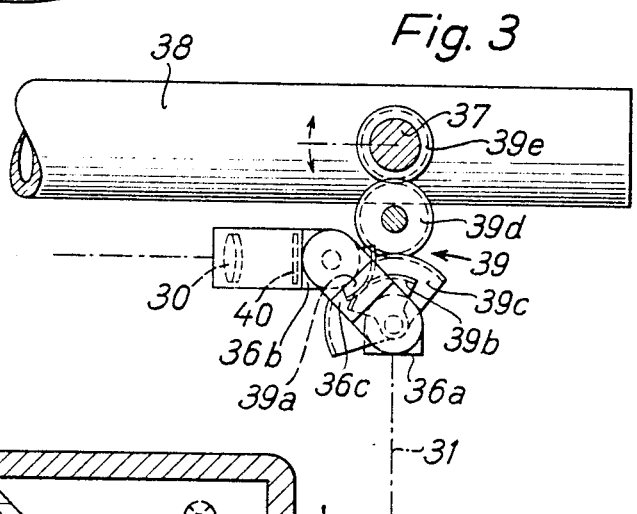
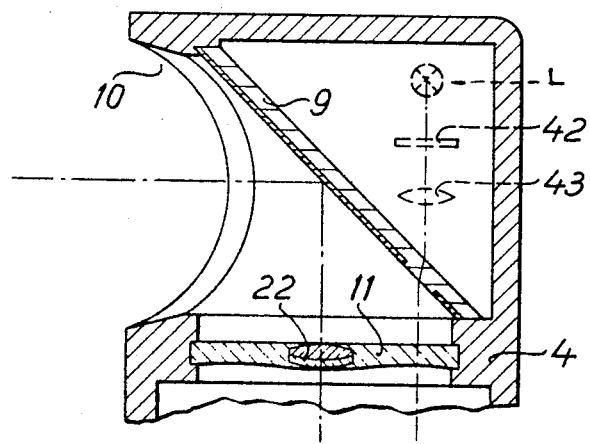

United States Patent Office 3,464,757
Patented Sept. 2, 1969

3,464,757
DAY-NIGHT OPTICAL VIEWING DEVICE
Horst Schmidt, Nauborn, Kreis Wetzlar, and Hellmut Böhmer, Hasselborn, Kreis Wetzlar, Germany, assignors to Ernst Leitz G.m.b.H., Wetzlar Optische Werke, Wetzlar, Germany
Filed Oct. 22, 1965, Ser. No. 501,766
Claims priority, application Germany, Feb. 24, 1965, L 50,053
Int. Cl. G02b 13/14
U.S. Cl. 350—1                     14 Claims

ABSTRACT OF THE DISCLOSURE

A sighting device for both daytime and nighttime viewing in which a dual optical system having the same beam path is arranged with a mirror objective assembly for night viewing and a lens system in the central portion of the mirror objective for day viewing. A fixed ocular assembly is provided in the beam path and two optical systems are provided one for night viewing including an image converter and one for day viewing including the intermediate optical system. Means are provided for selectively moving either the intermediate optical system or the movable night viewing system into the beam path for selective day or night viewing.

---

The present invention relates generally to the optical art and, more particularly, to an observation instrument which is equipped with optical means that can be switched over for day and night operation.

There exist combined day and night sighting devices or sights in which one of the two systems, namely, the optical system used for daytime operation or the image converter used for night viewing, can be switched into the path of the rays of the optical image erection means and the eye piece by means of light ray deflecting means, for example, mirrors or prisms. The drawback of such an arrangement is that a separate opening for the light rays has to be provided for each system.

However, there also exist arrangements incorporating two different viewing systems in which there is a common opening for the light rays and in which images can be formed selectively on the image screen of an image converter by means of two objectives having different focal lengths. This is accomplished by arranging one of the objectives in the central part of a mirror objective which is equipped with a collector mirror. Inasmuch as the objective field of view of the mirror objective is smaller than that of the other objective, there is thus obtained a partial or sectional observation. Such arrangements, however, do not provide a method of changing between night-viewing and day-viewing. This would not be possible by providing an image converter which can be swung out inasmuch as the ocular or eye piece is adjusted to the image plane of the screen and not to the reproduction plane of the optical system, which reproduction plane is spaced from and lies in front of the image plane of this screen. Furthermore, in such an arrangement, the centrally arranged objective has to have associated with it, due to the structural length of the mirror objective, at least one intermediate reproduction system between the first image plane and the image converter tube. But, particularly in the case of infrared corrected instruments, that is to say, instruments having a relatively large aperture, this reduces the quality of the reproduction.

It is, therefore, the primary object of the present invention to provide a sighting instrument which overcomes the above drawbacks.

Another object is to provide a day and night sighting mechanism utilizing the same beam path for the entering rays and which can be switched over between day and night viewing.

A further object is to provide a device of the type described wherein part of the main optical path is used for night viewing and part for day viewing.

A still further object is to provide a sighting instrument which can be arranged on a panoramic viewer.

These objects and others ancillary thereto are accomplished in accordance with preferred embodiments of the invention wherein a fixed optical axis or main beam path is provided by a mirror objective assembly for night viewing as well as a lens for day viewing disposed centrally of the mirror objective assembly, it being noted that the central portion of the mirror objective assembly is not used for night viewing. A night viewing system which includes an image converter and a day viewing system are mounted for selective movement into the main beam path. Thus, the instrument can be switched selectively for day or night viewing in a simple manner.

Additional objects and advantages of the persent invention will become apparent upon consideration of the following description when taken in conjunction with the accompanying drawings in which:

FIGURE 2 is a plan view of the change-over device and the connecting piece for the ocular.

FIGURE 3 is a fragmentary view showing the coupling between the observation head and a secondary weapon.

FIGURE 4 is a sectional view of the observation head.

Figure 1:
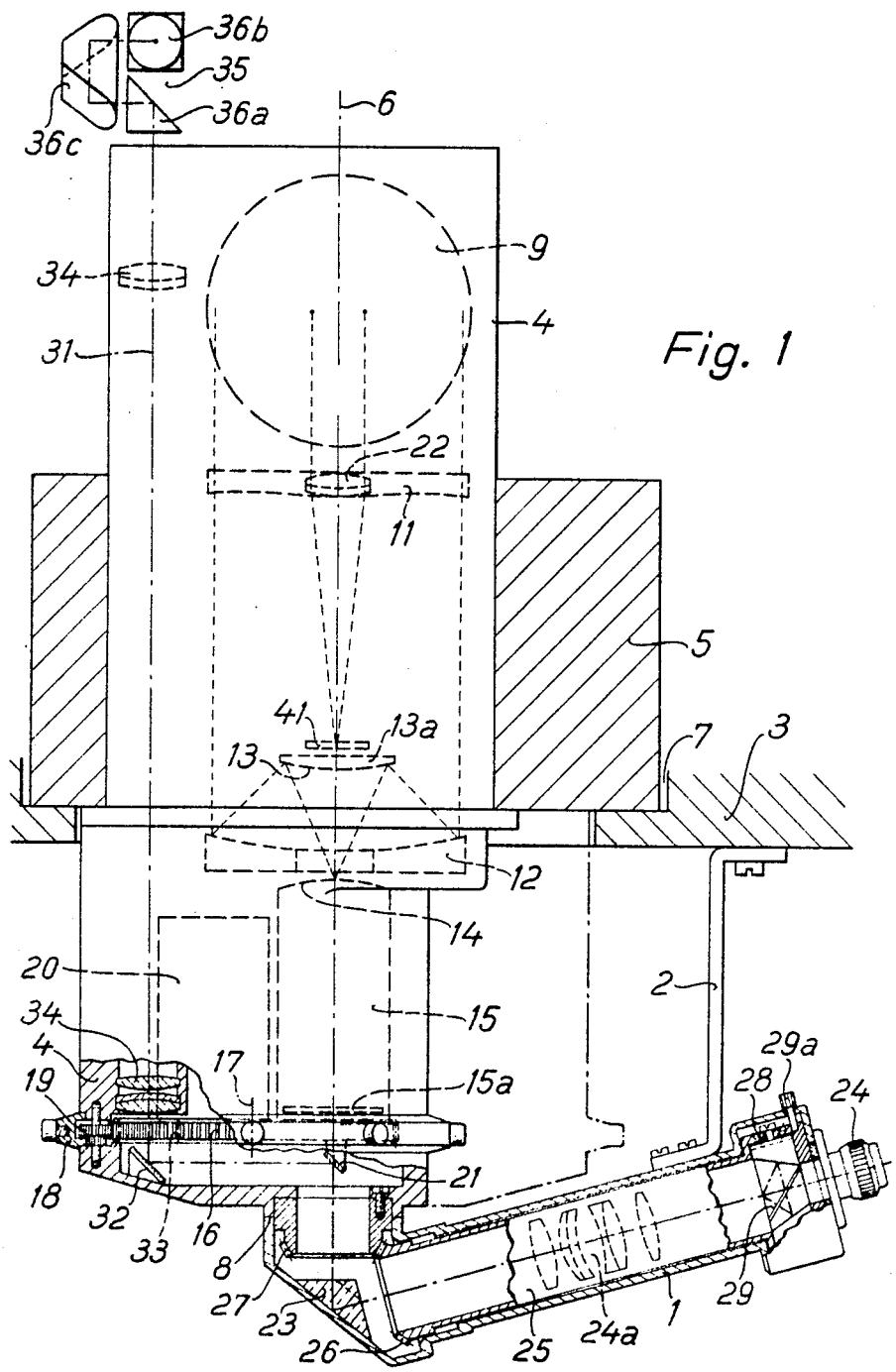
FIGURE 1 is a side view, partly in section, of a sighting instrument according to the present invention.

With more particular reference to the drawings, the same show the tube 1 of the ocular of the sighting or observation instrument. This tube 1 is connected by means of a bracket 2 with a fixed carrier 3 which may be part of the vehicle (not shown) on which the instrument is mounted; this vehicle may, for example, be an armored vehicle. The instrument further comprises a tube 4 which is carried by a plate 5, the latter being rotatably mounted in a bearing 7 of the carrier 3. There is a further rotary bearing 8 for the ocular tube, so as to provide for rotation about a vertical axis 6. Arranged in that portion of the tube 4 which extends upwardly above the pivotal bearing is a mirror 9, which is arranged in back of the opening 10 for the light rays.

The light rays are reflected to a mirror objective, which includes a Schmidt plate 11, a mirror 12 and a collector mirror 13. The optical axis of this mirror system coincides with the pivot axis 6 of the tube 4. The collector mirror 13, which is fashioned as a field lens 13a, is provided with a coating that serves as an interference filter. An infrared image of the target is developed by the mirror objective on a photo cathode 14 of an image converter 15. The image converter 15 is mounted on a revolving plate 16 (FIGURES 1 and 2) which is rotatable about an axis 17 by means of a hand wheel 18 and an intermediate pinion 19.

Also arranged on the revolving plate is an intermediate system 20 as well as a mirror 21 which can also be switched into the path of the light rays. The intermediate system 20 is a part of the optical system used for daylight viewing and the objective 22 of this system, as well as the above-mentioned field lens 13a, are arranged in the central part of the image objective which is not utilized for infrared viewing.

The instrument further comprises a deflecting prism 23 which is arranged below the revolving disc or turntable 16 and in the optical axis of the incoming light rays, this prism 23 being arranged ahead of the ocular tube 1. By means of this prism, the image produced on the screen 15a of the image converter 15 can be observed by means of the microscope, which includes the objective 24a and the ocular 24, which is inclined to form a small angle with the horizontal. Similarly, by means of this prism 23, the rays coming from the intermediate system 20 can be applied to the microscope. The focal length of this intermediate system 20 is so selected that the rays which come via the mirror 9 as well as the objective 22 and the field lens 13a are reproduced to form an intermediate image at the level of the screen 15a.

A sleeve 25 is arranged within the stationary ocular tube 1. One end of the sleeve 25 has a bevelled gear ring 26 which is in mesh with a coacting beveled gear ring 27, the latter being centered with respect to the axis 6. The other end of the sleeve is configured to form a part of a planetary gear drive 28 by means of which the movement of the tube 4 is transmitted, in a ratio of 2:1, to a turning prism 29 which is also arranged in the ocular tube. The turning prism 29 can be manually rotated by 90° by means of a positioning knob 29a and can be put into two different positions, depending on whether the day or night optical system is being used (FIGURES 1 and 2).

The mirror 21, which is mounted on the revolving disc 16, has a second additional day telescope associated with it which has a focal length different from that of the first-mentioned system and which is intended to make possible a wider angle observation. This additional day telescope comprises an intermediate system 34, which also is arranged in the tube 4 next to the two first-mentioned objectives, the deflecting systems 35, and the objective 30 which is arranged ahead of the system 35, see FIGURES 1 and 3. The optical axis 31 is parallel to the tube axis 6.

In order to direct the light rays into the path of the ocular rays, there is provided, next to the above-mentioned mirror 21, which is inclined at 45°, a further and similarly inclined mirror 32 below the intermediate system 34. The revolving disc is provided with an opening 33 to allow the light rays to pass through it and to mirror 32 when the mirror 21 is switched into operating position above prism 23. The deflecting system 35 at the input side contains, as shown in FIGURE 3, a carrier prism 36a, a prism 36b which is vertically pivotable in a range of something more than 90°, as well as a prism 36c arranged therebetween. The objective or lens 30 is connected to the prism 36b. Elevational movements of the objective are transmitted, in a ratio of 1:1 by means of the drive 39 shown in FIGURE 3, to a trunnion 37 of a gun 38. The lens 30 is thus always pivoted parallel to the secondary weapon. This movement is accomplished by gear segment 39a attached to a tube holding objective 30. This is in mesh with a gear segment 39b which rotates with a larger segment 39c. The latter meshes with an idler 39d which engages gear 39e fixed to trunnion 37.

The mirror 9 can also be coupled with a weapon which, however, is not illustrated. In such an event, however, the mirror 9 will be pivotable throughout but a relatively narrow range, this range corresponding to the generally limited elevation angle of this weapon, the same being the primary weapon.

For target locating, each telescope system is provided with a locating marker reticle 40. The line or locating marker reticle 40 for the supplemental telescope is arranged directly behind the objective 30, shown in FIGURE 3. The line marker reticle of the other optical system used for daytime viewing, lying in the axis 6, is indicated at 41. The line marker reticle 42 for the mirror objective is reproduced on the photo cathode by means of a separate optical system 43, as shown in FIGURE 4. For this purpose, the mirror 9 is either partly silvered or it is light-permeable at the place where the light beams from lamp L for the marker are to pass through.

When the instrument is to be used for infrared viewing, the light rays reflected by the mirror 9 are applied via the mirror 12 through the collector mirror 13, the same being fashioned as the infrared filter, from which the light is reflected to the photo cathode 14. The target image which is produced on the image screen 15a of the image converter can be viewed through the ocular 24, which has arranged ahead of it the turning prism 29 and the deflecting prism 23.

When the instrument is to be used for daytime viewing, the image converter 15 is replaced by the intermediate system 20 which is also mounted on the revolving disc 16 and the turning prism 29 is turned by 90° by means of the positioning knob 29a, in order to obtain the same image erection.

It will thus be seen that, in accordance with the present invention, there is provided a viewing instrument in which a conventional objective is connected ahead of the image converter which serves for night viewing. Furthermore, the objective for use during daytime viewing is arranged in the part of the mirror objective which is not used for night viewing, and which objective has arranged behind it an intermediate system which can selectively be positioned into the viewing path in lieu of the image converter. The image converter and the intermediate system are mounted on a revolver which is rotatably mounted in the housing.

It is another feature of the present invention that the collector mirror of the mirror objective is provided with a coating which functions, as an interference filter which reflects only the infrared light rays. The collector mirror is preferably carried by a field lens which is arranged between the objective and the intermediate system of the daytime optical means.

According to a further feature, and to enable the observation instrument to pick up a target, a target line marker is provided in the reproducing plane of the objective of the daytime optical system, this target line marker preferably being displaceable.

According to another feature, the instrument as a whole can be refined by fashioning it as a panoramic viewer. This may be done by arranging the deflecting miror which is arranged ahead of the two optical systems for rotation about a vertical axis which, if the observation instrument is used in an armored vehicle such as a tank, may coincide with the turning axis of the tank turret. Alternatively, the two systems can be mounted for rotation together, preferably in a common tube. In order to obtain a picture which is correct insofar as direction and elevation are concerned, the rotation of the tube, or of the mirror, is transmitted, in a ratio of 2:1, to a turning prism which is rotatably mounted in the stationary ocular tube. In order to facilitate the observation, the ocular is arranged horizontally and a suitable deflecting prism is arranged in the path of the light.

It will also be seen from the above that, in accordance with a further feature of the present invention, there is arranged, besides the mentioned two objective systems which preferably have the same focal length, a third objective, likewise for daytime viewing, for which there is provided a separate inlet for the rays but which has a different focal length from the two first-mentioned systems, so that the observation which is made possible by the instrument as a whole is substantially increased. The arrangement is preferably such that a magnification of 5 to 6 is produced by one of the objectives for daylight viewing, thereby to make it possible readily to identify the target, and to let the supplemental objective have a magnification of approximately 1.5, so as to give a good field of view that allows ready target location. The supplemental system is provided with a movable reflection system at the input side, the same being analogous to the mirror or prism provided for the other two systems, but being pivotable through a larger elevational angle, for example, about 95°. This reflection system can also be coupled with a device by means of which its movement is transmitted to a weapon, in a ratio of 1:2.

Preferably, the supplemental telescope is also arranged in a tube which is rotatable about the vertical axis and can, selectively, be positioned into the light beams of the combined day and night objective. Here, there is provided, besides the deflecting mirror which is fixed with respect to the tube, a further mirror which is arranged on the change-over device, which is provided in place of the intermediate system or the image converter, ahead of the ocular.

It will be understood that the above description of the present invention is susceptible to various modifications, changes and adaptations, and the same are intended to be comprehended within the meaning and range of equivalents of the appended claims.

What is claimed is:

1. An observation instrument for day and night viewing, comprising, in combination:
    (a) a movable night viewing optical system including an image converter having an optical pick-up at one end and a screen at the other end;
    (b) a movable day viewing intermediate optical system;
    (c) means in front of said optical systems defining a fixed beam path and including a mirror objective assembly the central portion of which is transparent to visible light and having a primary mirror and a collector mirror having a coating which functions as an interference filter to reflect infrared light rays only for the night viewing optical system focused at the plane of said pick-up and a lens assembly including a field lens which carries said collector mirror for the day viewing optical system disposed in the central portion of the mirror objective assembly which is not used for night viewing focused in the same plane as said screen;
    (d) an ocular assembly arranged in said fixed beam path and behind said optical systems and focused onto said screen plane; and
    (e) means for selectively moving one of said optical systems into said beam path to adapt the instrument for day or night viewing.

2. An instrument as defined in claim 1 wherein said path defining means includes a target line marker disposed in the image plane of the lens for day viewing.

3. An instrument as defined in claim 2 wherein said marker is displaceable.

4. An instrument as defined in claim 1 wherein said beam path defining means includes a deflector mirror disposed at the light input side of the instrument and common to the mirror objective assembly and the lens for day viewing.

5. An instrument as defined in claim 1 wherein said beam path defining means includes a tube-like housing, said moving means including a revolving disc in said housing and on which said optical systems are mounted.

6. An instrument as defined in claim 5 wherein the beam path is vertical and said housing is mounted for rotation about the beam path axis, and further comprising means for driving said housing.

7. An instrument as defined in claim 6 which is mounted on an armored vehicle having a turret, said driving means including a coupling between the turret and the housing.

8. An instrument as defined in claim 6 wherein said ocular assembly is a stationary tube housing a sleeve which is rotatable therein; first gear means connected between said housing and said sleeve for transmitting rotation of the housing to the sleeve, said ocular assembly including a turning prism; and second gear means connected between said sleeve and said turning prism for transmitting turning movement of said sleeve to said turning prism in the ratio 2:1, the turning prism being rotatable through 90° for adapting to the different optical conditions in the two optical systems.

9. An instrument as defined in claim 1 comprising a third optical system having a light ray inlet which is separate from that of the other optical systems, and a lens of different focal length than that of the other optical systems, said third optical system being connected to be placed into operation by said moving means.

10. An instrument as defined in claim 9, wherein said third optical system includes pivotally mounted optical means at the inlet and which can be moved through an elevational angle of about 95°.

11. An instrument as defined in claim 9 wherein said beam path defining means include a tube-like housing in which said moving means are disposed, said third optical system being arranged so that its beam path passes through said housing parallel to the beam path of said path defining means.

12. An instrument as defined in claim 11 wherein said ocular assembly is arranged for viewing through the particular optical system which is disposed in the operative position by the moving means, said third optical means including a first mirror fixedly mounted in the housing and a second mirror mounted on said moving means.

13. An observation instrument as defined in claim 1 wherein said collector mirror and said field lens are constituted by a single element.

14. An observation instrument for day and night viewing, comprising, in combination:
    (a) a movable night viewing system including an image converter having an optical pick-up at one end and a screen at the other end;
    (b) a movable day viewing intermediate optical system;
    (c) means in front of said optical systems defining a fixed beam path and including a mirror objective assembly having the central portion of which is transparent to visible light and having a primary mirror and a collector mirror having a coating which functions as an interference filter to reflect infrared light rays only for the night viewing optical system focused at the plane of said pick-up and a lens assembly including said collector mirror which is arranged in said lens assembly to act as a field lens which carries said collector mirror for the day viewing optical system disposed in the central portion of the mirror objective assembly which is not used for night viewing focused in the same place as said screen;
    (d) an ocular assembly arranged in said fixed beam path and behind said optical systems and focused onto said screen plane; and
    (e) means for selectively moving one of said optical systems into said beam path to adapt the instrument for day or night viewing.

References Cited

UNITED STATES PATENTS

| 1,167,164 | 1/1916 | Grebe | 350—10 X |
| 1,290,746 | 1/1919 | Hollander | 350—52 X |
| 1,967,214 | 7/1934 | Acht. | |
| 2,152,726 | 4/1939 | Baroni. | |
| 2,903,592 | 9/1959 | Bolay | 350—166 X |
| 2,946,255 | 7/1960 | Bolay | 350—1 |
| 2,970,220 | 1/1961 | Bouwers | 250—213 |
| 3,064,526 | 11/1962 | Lindsay | 350—27 X |
| 3,173,012 | 3/1965 | Winter | 350—27 X |
| 3,324,300 | 6/1967 | Bouwers | 250—213 |

DAVID SCHONBERG, Primary Examiner

T. H. KUSMER, Assistant Examiner

U.S. Cl. X.R.

350—10, 18, 23, 28, 29, 49, 50, 52, 163; 250—83, 213